United States Patent [19]

Dietrich et al.

[11] 4,173,511
[45] Nov. 6, 1979

[54] CONTROL ROD BLOW OUT PROTECTION SYSTEM

[75] Inventors: Joseph R. Dietrich, West Hartford; William S. Flinn, Bloomfield; Malcolm D. Groves, Simsbury, all of Conn.

[73] Assignee: Combustion Engineering, Inc., Windsor, Conn.

[21] Appl. No.: 270,319

[22] Filed: Jul. 10, 1972

[51] Int. Cl.² ............................................. G21C 7/12
[52] U.S. Cl. ................................................. 176/36 R
[58] Field of Search .............. 176/36 R, 36 SA, 36 C, 176/35, 86 R

[56] References Cited

U.S. PATENT DOCUMENTS

| | | | |
|---|---|---|---|
| 3,257,286 | 6/1966 | Ryon et al. | 176/35 |
| 3,347,747 | 10/1967 | West et al. | 176/86 R |
| 3,390,052 | 6/1968 | McDaniels, Jr. | 176/35 |
| 3,462,345 | 8/1969 | Jabsen | 176/36 R |
| 3,533,912 | 10/1970 | Dempsey | 176/36 R |
| 3,573,166 | 3/1971 | Germer | 176/36 R |

FOREIGN PATENT DOCUMENTS 612009  1/1961  Canada ................................. 176/86 R

OTHER PUBLICATIONS

SROO-207-30, Jun. 1964, pp. VI-1, VI-2, VI-3, and FIGS. IV-3, IV-5, VI-9, VI-12, VI-18, VI-19, VI-20, VII-50.

Primary Examiner—Harvey E. Behrend

[57] ABSTRACT

An absorber element "blow-out" protection system for a nuclear reactor having a pressure vessel through which a coolant is circulated. The blow-out protection system includes devices which hydraulically couple groups of guide tubes in which the absorber elements move, the coupling devices limiting coolant lift flow rate to a level commensurate with the raising of individual absorber elements but insufficient to raise a plurality of absorber elements simultaneously.

4 Claims, 7 Drawing Figures

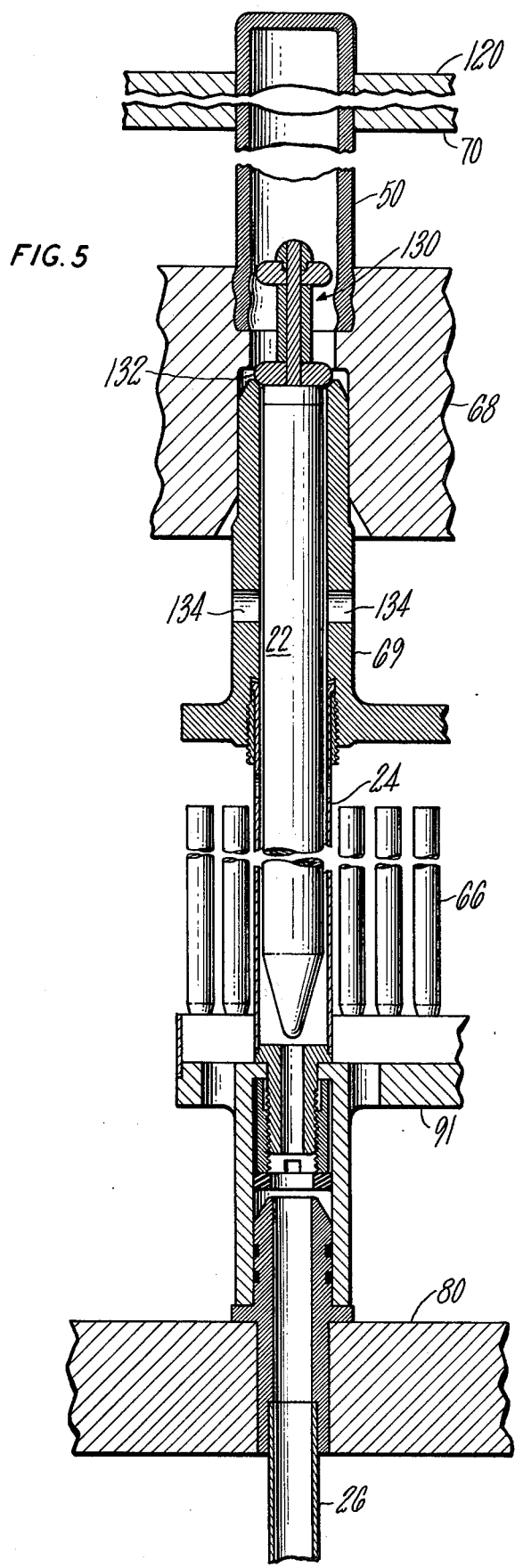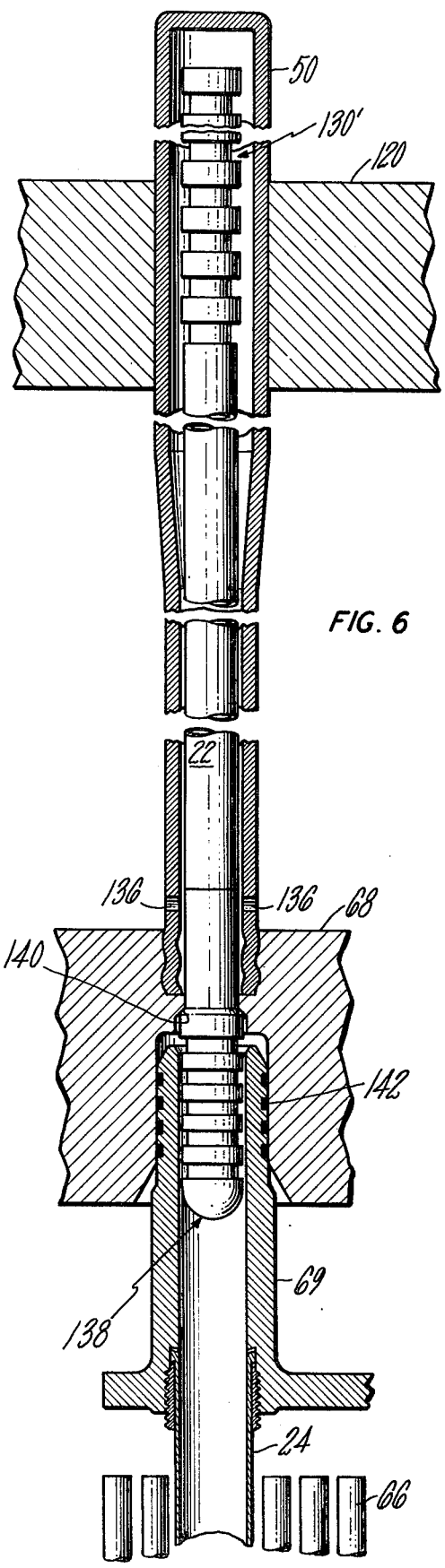

CONTROL ROD BLOW OUT PROTECTION SYSTEM

BACKGROUND OF THE INVENTION (1) Field of the Invention

The present invention relates to nuclear reactors and particularly to the control of pressurized water type reactors. More specifically, this invention is directed to a reactor control system employing a large number of low worth absorber elements and especially to the means for exercising individual control over the position of each element. Accordingly, the general objects of the present invention are to provide novel and improved methods and apparatus of such character.

(2) Description of the Prior Art

The conventional prior art approach to reactor control encompasses the use of comparatively few control rods, also known as absorber elements, of high worth. The use of a small number of elements of high worth, in turn, dictates that the control system be capable of moving the absorber elements in steps. Prior art reactor control systems are, accordingly, generally characterized by complexity and lack of flexibility.

In addition to control system complexity, the prior art technique of using high worth absorber elements has weighed against the association of an absorber element with each fuel bundle. This fact, coupled with the stepwise movement of prior art absorbers, has had a tendency to produce undesirable axial distortions in the reactor core; such axial distortions principally being produced as a consequence of partial insertion of absorber elements.

A further disadvantage of prior art control systems has resided in the practice of extending the actuators for the absorber elements out of the pressure vessel, typically through the removable vessel head, in the interest of facilitating access to the actuators for control purposes. The penetration of the reactor pressure vessel by a plurality of actuators has increased both sealing requirements and, when penetration of the vessel head was the mode of access, the difficulty of reactor head removal as is necessary for inspection and maintenance operations such as refueling. Pressure vessel penetration by the actuator means also imposed physical limitations on the number and placement of the absorber elements and additionally prevented the association of an absorber element with each fuel bundle.

In the interest of enhancing system safety, means for preventing absorber element "blow-out" have been required in all reactor installations. While an unlikely occurance, absorber element "blow-out" could occur if an unexpectedly high pressure differential was established across the actuator means employed to controllably withdraw the control rod from the reactor core. In the prior art such "blow-out" protection means have typically included active devices such as hydraulic fuses or mechanical latches which would be installed within the pressure vessel. Periodic testing of such safety devices is generally impossible. Use of an active type safety device which cannot be periodically cycled to insure operability is obviously undesirable.

While all prior art actuators provided for a gravity "scram", that is the full insertion of all absorber elements solely under the influence of gravity in the case of a system malfunction, prior systems which have attempted to also incorporate a faster acting power "scram" have been characterized by undue complexity. Ideally a power "scram" should be achieved by operating the minimum number of components.

SUMMARY OF THE INVENTION

The present invention overcomes the above briefly discussed and numerous other disadvantages of the prior art by providing a novel fine grain reactor control system. The control system of the present invention employs a comparatively large number of low worth absorber elements associated with individual hydraulic actuator assemblies. The use of individual actuators enables the absorber elements to be moved independently of one another while the use of a large number of low worth absorber elements permits the association of at least one absorber with each fuel bundle.

In accordance with the invention the position of the individual absorber elements is determined by controlling the hydraulic pressure applied to the lower ends of the guide tubes in which the respective absorber elements move.

Also in accordance with this invention, the absorber elements are either fully inserted or fully retracted from the core and the axial distortions which have characterized prior art reactor systems are thereby minimized.

Further in accordance with the present invention the absorber element actuator assemblies are positioned entirely within the reactor vessel thereby reducing sealing requirements and enhancing safety by placing the actuators in a position where they are least apt to be damaged. Since the invention is a "bottom" actuated system, a "clean" reactor head which can be readily removed for inspection and maintenance is thus permitted.

Also in accordance with the invention, control rod "blow-out", for example in the event of pressure vessel rupture, is prevented through the use of apparatus which does not require normally inoperative active devices such as latches and fuses. Thus, the safety of a reactor in accordance with the present invention is enhanced by designing the absorber element and its hydraulic actuator in such a manner that the actuator assembly performs the dual functions of absorber position control and "blow-out" protection.

A still further feature of the present invention is the achievement of a power "scram" mode of operation merely through the opening of a single control valve located externally of the reactor pressure vessel.

BRIEF DESCRIPTION OF THE DRAWING:

The present invention may be better understood and its numerous objects and advantages will become apparent to those skilled in the art by reference to the accompanying drawing wherein like reference numerals refer to like elements in the several figures and in which:

FIG. 5 is a partial side elevation view, partially in section, depicting a second embodiment of a control rod actuator assembly in accordance with the present invention;

FIG. 6 is a partial side elevation view, partially in section, of a third embodiment of a control rod actuator assembly in accordance with the present invention; FIG. 7 showing an alternative mode of achieving "blow-out" protection.

DESCRIPTION OF THE PREFERRED EMBODIMENTS

Figure 1:
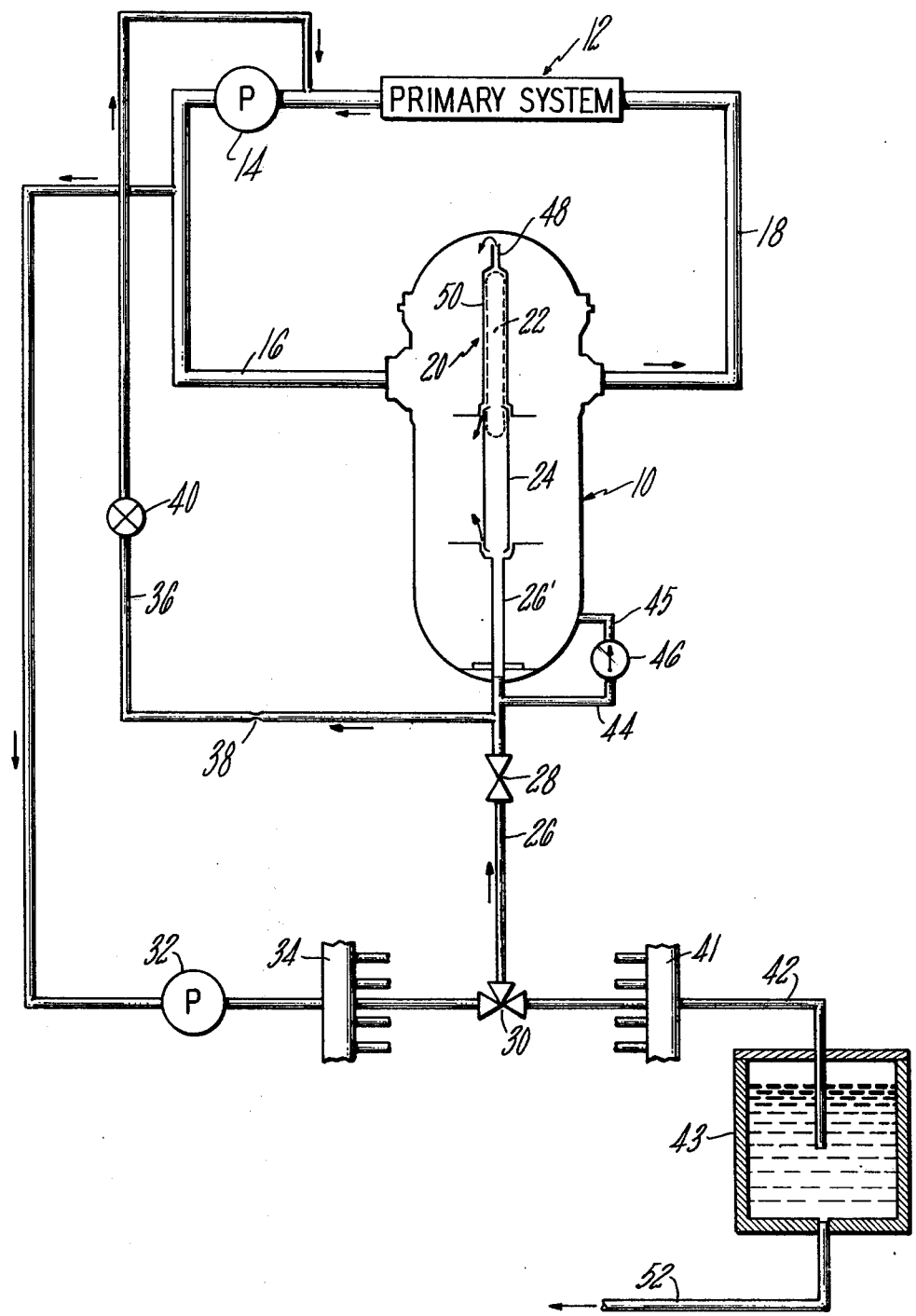
FIG. 1 is a schematic view of a preferred embodiment of a bottom actuated reactor control system in accordance with the present invention.

With reference now to FIG. 1, the pressure vessel of a pressurized water reactor is indicated generally at 10. Reactor vessel 10 provides a housing for the various elements of a fission type nuclear reactor of the kind employed by utilities to heat a circulating coolant; the coolant thereafter being routed through the heat exchangers and other components of a steam generator and the steam thus provided being employed to drive a turbine and its associated electrical power generator. In FIG. 1 the steam generators and associated equipment have been labeled "primary system" and are indicated generally at 12. The main circulating pump for the coolant is indicated at 14 and supplies, via conduit or cold leg 16, the coolant to pressure vessel 10. The heated coolant exits from the pressure vessel 10 via conduit or hot leg 18 and is thereafter delivered to "primary system" 12.

As is well known in the art, a core assembly including a plurality of fuel rods or elements is positioned in pressure vessel 10. Also positioned within vessel 10, in the interest of controlling the fission rate and thus reactor output power, are control or absorber rod assemblies; a typical such assembly being indicated schematically and generally at 20 and including an absorber element 22. In accordance with the present invention, each of the control rod assemblies has two operative positions commensurate respectively with full retraction and insertion of its absorber element into the reactor core. As shown in FIG. 1, and as will be described in greater detail below, absorber element position control is achieved by providing each individual control rod assembly with a hydraulic actuator.

Continuing with a discussion of FIG. 1, and as will also be described in greater detail below, each independently controllable absorber assembly in accordance with the present invention is a bottom actuated device which utilizes hydraulic pressure to determine absorber element position. That is, the position of the absorber elements, such as element 22, in accordance with the invention is determined by the application of pressure to the lower ends of guide tubes, such as tube 24, which comprise part of the hydraulic actuator of each individual control rod assembly. A plurality of control lines commensurate in number with the absorber elements, such as line 26—26' associated with the control rod assembly 20, will penetrate the pressure vessel and will deliver the control pressure utilized to position the absorber element 22 to guide tube 24. Each of control lines 26 will include a main control or "scram" isolation valve 28. In accordance with a preferred embodiment of the invention, a three way power "scram" control valve 30 may also be inserted in control line 26. As will be explained below, if valve 30 is employed, valve 28 will be a two way valve. Upstream of the control valve or valves the control lines are connected to a lift pump 32 via a manifold 34. Pump 32 provides the lift flow required, in the manner to be described below, to raise the absorber elements from their rest or inserted position to the retracted position commensurate with maximum reactor power output as depicted for element 22 of FIG. 1.

Figure 3:
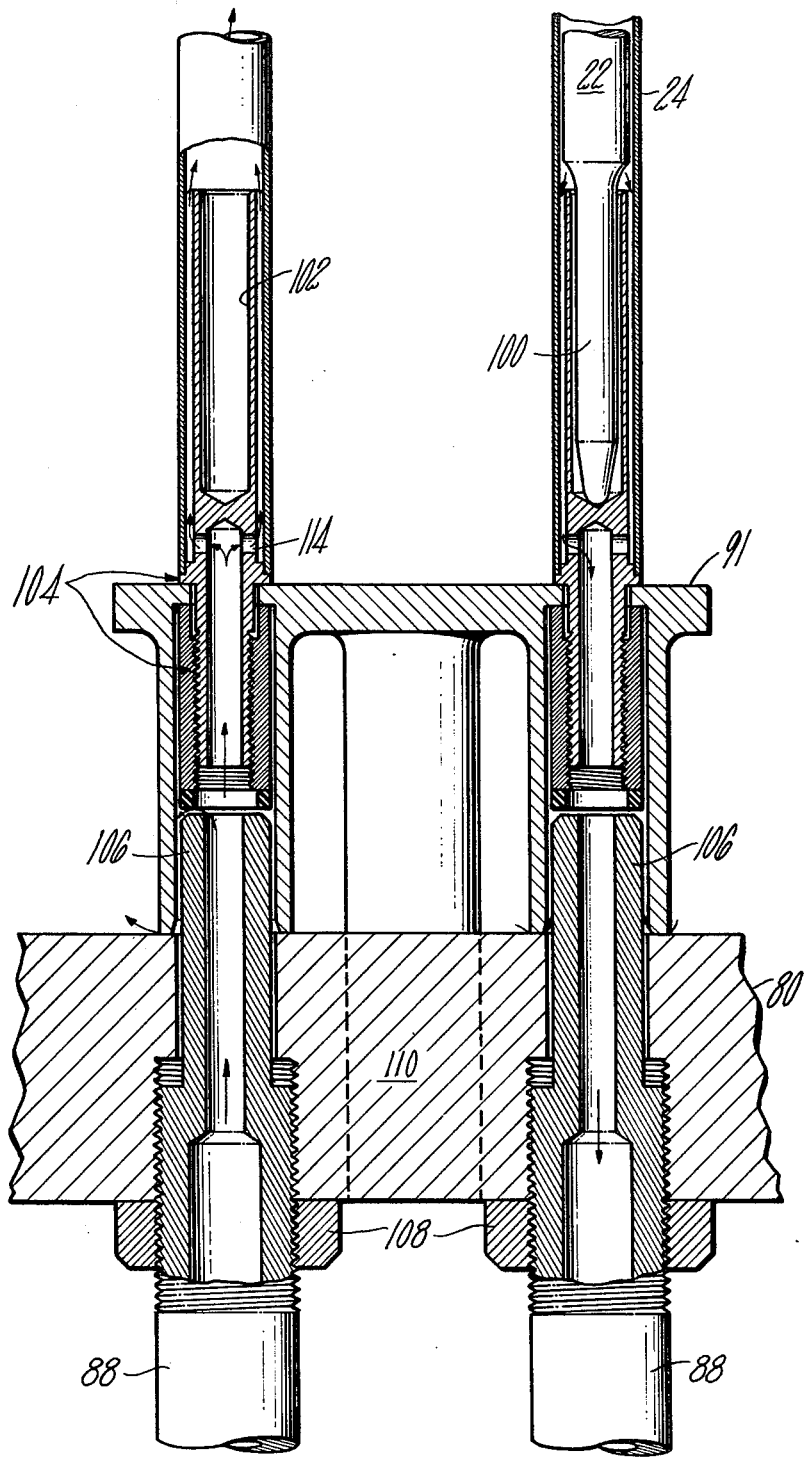
FIG. 3 is an enlarged side elevation view, partially in section, of the lower portion of a first embodiment of a control rod assembly in accordance with the present invention, FIG. 3 depicting a pair of actuators with one absorber element inserted in the core and the other element withdrawn.

A cooling flow for the absorber elements is necessary; particularly when the elements are in the fully inserted position as in the case with the right hand absorber of FIG. 3. Accordingly, means are provided to draw off a cooling flow through guide tube 24 and internal control line portion 26'. This cooling flow is derived from the primary coolant delivered to pressure vessel 10 and the flow path through the actuator assembly will be described in detail below in the discussion of FIGS. 3 and 4; the coolant entering control rod assembly 20 through a "blow-down" orifice 48 provided in an upper guide cylinder 50 which forms part of assembly 20. Cooling flow exiting the pressure vessel via control line 26' is delivered back to the main coolant flow loop, upstream of main circulating pump 14, via a branch conduit 36. Conduit 36 is provided with a flow restricting orifice 38 which controls the cooling flow to a small value. It is to be noted that the cooling flow serves the secondary function of absorber element hold down with the control rod fully inserted. Branch conduit 36 is also provided with a check valve 40 located downstream of restriction 38. Check valve 40 prevents reverse flow through conduit 36 during a power "scram" operating mode as will be discussed below.

As briefly discussed above, the present invention may, if considered necessary or desirable, include a power "scram" operating mode. If power "scram" is desired the three-way valve 30 will be included in control line 26 and one side of the valve will be connected, via a manifold 41 and conduit 42, to a suitable low pressure source. In the embodiment of FIG. 1 the low pressure source is depicted as a quench tank 43 which is maintained at atmospheric pressure.

Under a power "scram" condition valve 30 will be operated to disconnect lift pump 32 from the control system and to establish communication between the interior of guide tube 24 and the interior of tank 43 via valve 28. Since the pressure in tank 43 will be much less than the coolant pressure maintained within vessel 10, a pressure differential across the absorber element 22, established in the manner to be described below, will drive the absorber rapidly downwardly to the full inserted position; the rate of descent being in part controlled by the resistance of the conduit 42 in the interest of preventing damage to the absorber element at the bottom of the down stroke. Pressure vessel coolant will, with the actuator assembly disconnected from lift pump 32, enter cylinder 50 via orifice 48 thereby creating the aforementioned pressure differential necessary for the power "scram" operation. It is also to be noted that, in the interest of avoiding the necessity of using an exceedingly large tank for the low pressure source, means such as the reactor's nuclear instrumentation or a timer associated with valve 30 will be provided for sensing the full insertion of the absorber element and closing valve 28 upon achieving of the "scram" condition. If valve 28 is not closed after the full inserted condition of the absorber elements is achieved the relatively high power "scram" flow rate would result in rapid filling of tank 46 and a very large tank would be required to prevent development of an undesirable back pressure. Coolant delivered to tank 46 during a power "scram" is returned, via conduit 52, to the main coolant flow path.

In the manner known in the art, the position of each absorber element may be sensed by means which measures the pressure differential between the interior of the pressure vessel and the interior of the control lines on the actuator side of control valve 28. In FIG. 1 the position indicating means is indicated as conduits 44 and 45 and sensor-indicator 46. The position indicator may also be utilized to control valve 28 during a power "scram" mode; the pressure across the control rod reversing when the absorber element becomes seated with the vessel pressure being greater than the control line pressure.

The normal operation of the control system of FIG. 1 will now be briefly described. Whenever fission is occurring one or more main coolant circulating pumps, such as pump 14, will be operating and coolant will be circulating through the pressure vessel 10. With the absorber element in the inserted position, a small cooling flow will, as briefly discussed above, be drawn off through upper guide cylinder 50, guide tube 24 and control line 26 and returned to the low pressure or downstream side of pump 14 via conduit 36. This cooling flow will serve the dual purpose of preventing overheating of the absorber element and providing a hold down pressure differential across the absorber element. Under normal conditions with the absorber element inserted the lift pump 32 will be isolated from the hydraulic actuator by valve 28 which will be presumed to be initially closed. If it is desired to raise absorber element 22 valve 28 will be opened and communication between lift pump 32 and the bottom of guide tube 24 will be established via manifold 34, valve 30, valve 28 and control line 26. The lift flow provided by pump 32 will act on absorber element 22, which in the preferred embodiment also functions as a lift piston, and the absorber element will be raised to the fully withdrawn position shown in FIG. 1. Some of the lift flow provided by pump 32 will, of course, be drawn off via conduit 36 and returned to the primary coolant flow path. The remainder of the lift flow delivered to conduit 26 will be employed to maintain the absorber element 22 in the raised position; the majority of the flow exiting from upper guide structure via "blow down" orifice 48. If it is desired to reinsert the absorber element 22, in the usual power assisted gravity "scram" mode, valve 28 will be closed thereby permitting operating fluid entrapped in guide tube 24 to be drawn off via conduit 36 and the absorber element 32 to decend under the influence of gravity. Flow of pressure vessel primary coolant into upper guide cylinder 50 via orifice 48 will provide a measure of power assistance to the normal gravity "scram". It is again to be noted that, if a power "scram" mode is not deemed necessary, control of absorber element position is achieved solely through the use of valve 28 and valve 30 will be eliminated from the system.

A particularly novel feature of the present invention is the provision of protection against control rod "blow out" without the necessity of using auxiliary active safety devices. Should there be a pressure vessel rupture the main coolant pressure would immediately drop to atmospheric thereby creating a high pressure differential across a fully inserted absorber element. This pressure differential will cause fluid in control line 26 to flash to steam developing a high pressure which would tend to drive the absorber element upwardly. However, the flow limiting "blow down" orifice 48 is sized so as to achieve absorber element lift only with normal lift flow rates. If a large pressure differential is applied across orifice 48, commensurate with a vessel rupture, the requisite flow rate for absorber element lift will not be achieved because two phase flow will occur. Restated, the sudden application of a large pressure drop across orifice 48 will, due to the sizing of the orifice, cause a portion of the fluid attempting to exit from the upper guide support tube to flash to steam and flow through the orifice will be a steam-coolant mixture at a very low mass flow rate. This low flow rate prevents the rapid decay of the back pressure resulting from coolant entrapped in upper guide cylinder 50 above the absorber element and thus insures that the high pressure resulting from the flashing of coolant in control line 26 will not produce a pressure differential across the absorber element which is sufficient to move the elements upwardly.

Figure 2:
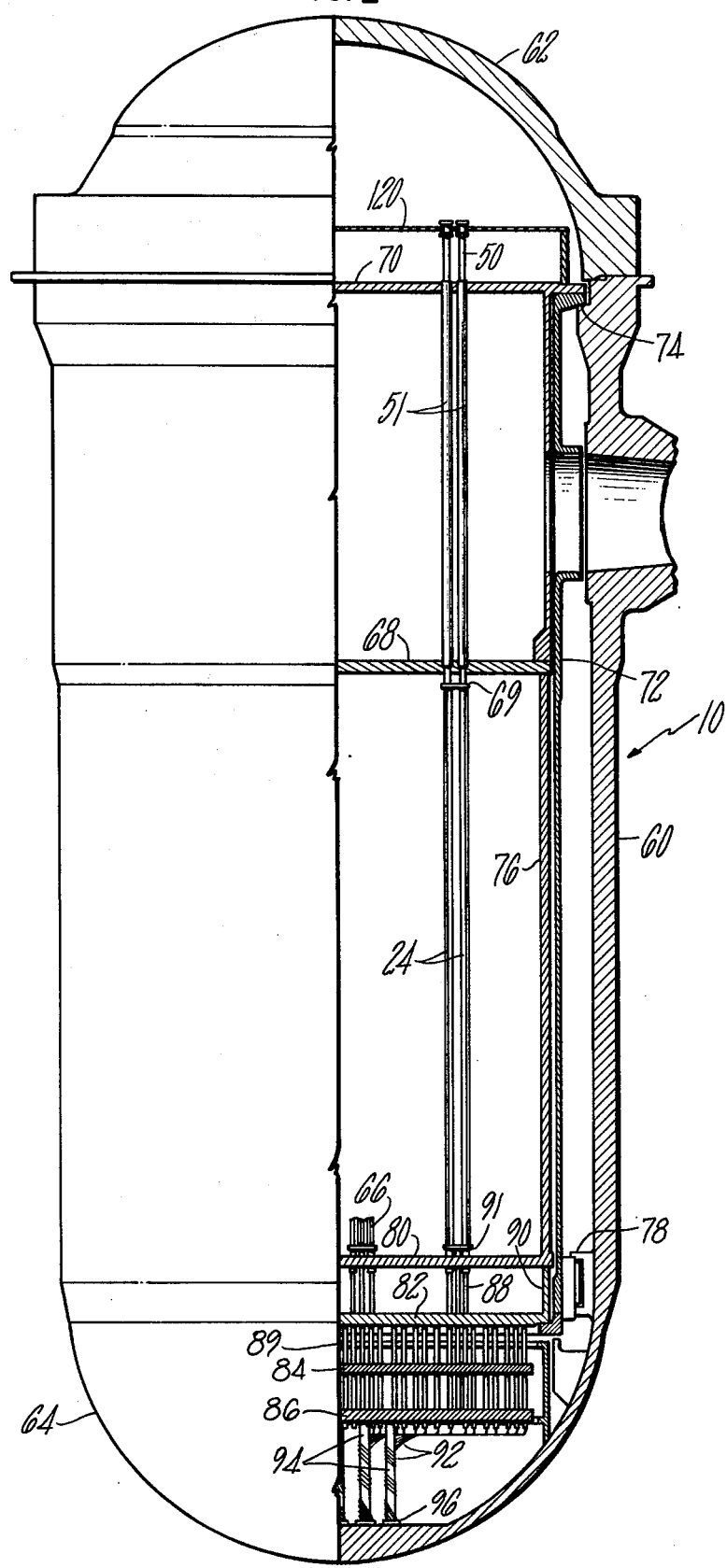
FIG. 2 is an enlarged view, partially in section, of the pressure vessel of the reactor of FIG. 1, FIG. 2 showing generally the placement of the control elements within the vessel.

Referring now to FIG. 2, the pressure vessel 10, partly broken away to show the fuel and control rod assemblies, may be seen. Pressure vessel 10 includes a main vessel portion 60, a reactor top head 62 and a bottom head 64. A fuel assembly, which includes individual fuel rods as indicated at 66 and the absorber element guide tubes 24, is positioned within vessel 10 below a fuel assembly alignment plate 68. An upper guide structure, which includes the upper guide cylinder 50 and the upper guide structure support tubes 51 which are coaxial therewith, is positioned in vessel 10 generally above the fuel assembly alignment plate 68. The upper guide structure includes, in addition to tubular members 50 and 51, an upper support plate 70 which bridges the top of the core support barrel 72. The core support barrel is hung from the top of pressure vessel main portion 16, as indicated at 74, and includes a core shroud 76. Core barrel snubbing means, indicated at 78, is provided within the pressure vessel to prevent excessive core barrel lateral motion. Within the core barrel 72 the core is supported on a pair of vertically displaced lower support plates 80 and 82. A pair of further vertically displaced support plates 84 and 86 are located below core barrel 72.

A particularly novel feature of the present invention resides in the use of the spaced support plates 80, 82, 84 and 86 interconnected by tubular stiffening members to provide the lower support structure. These stiffening members, as indicated by reference numeral 88, serve the dual function of providing structural rigidity and also define portions of the internal sections 26' of the control lines. As may be seen from FIG. 3, the tubular members 88 are adjustably engaged with the uppermost lower core support plate 80 and are welded to lower plate 86. Coaxial tubular spacers 89 are provided about members 88 to position plates 82 and 84. Plate 82 is also provided with an upwardly extending flange 90 which spaces plate 82 from plate 80.

All four support plates are apertured to permit passage of the tubes 88 therethrough. Fluid communication between the tubes 88 and the guide tubes 24 is achieved through the fuel assembly lower end fittings, such as fitting 91, which rest on plate 80 in engagement with fuel assembly alignment pins which will be described in the discussion of FIG. 3.

In the preferred embodiment of the invention, as depicted in FIGS. 1 and 2, the control lines penetrate pressure vessel 10 through bottom head 64. To this end, beneath the lowermost support plate 86, the control lines are brought together in clusters, as indicated at 92, and these clusters are directed downwardly along a plurality of tubular members 94. At the inner surface of the pressure vessel lower head the internal control lines 26' are coupled to the external control lines 26 via multiple plate seal connectors of the type disclosed and claimed in copending application Ser. No. 211,288 filed Dec. 23, 1971, entitled "Control Line Disconnect Assembly", and assigned to the assignee of the present invention. Copending application Ser. No. 211,288 is hereby incorporated herein by reference. The connectors are indicated in FIG. 2 by reference numeral 96. The portions of the control lines at the external side of connectors 96 are defined by holes drilled in the pressure vessel with the lines 26 being welded to the exterior of the vessel. It is to be noted that a single plate connector may be employed rather than the plurality of connectors 96 if desired.

Should it be desired to remove the entire core assembly, including the lower support structure, the top head 62 is removed, the upper guide structure taken out of the vessel, the fuel assemblies are removed and a tool inserted through flow holes 110 in the core support plate 80. The tool is utilized to unbolt each of the connectors 96 permitting removal of the complete core support assembly.

FIG. 3 is an enlarged view of the lower portion of the actuator assembly of FIG. 2. As shown in FIG. 3 the absorber element 22 of the right hand control rod assembly is fully inserted in the core and, in the inserted position, a "scram" buffer piston extension 100 of element 22 is supported in the bottom of a blind hole in a "scram" buffer tube 102. The left hand control rod of FIG. 3 has been lifted to the fully withdrawn position and is shown in this position in FIG. 4. It is to be observed that, in the embodiment of FIG. 2, the absorber element 22 itself functions as a lift piston which moves within the guide tube 24 and cylinder 50. The guide and "scram" buffer tubes terminate at and are welded to a guide tube retainer nut assembly, indicated generally at 104, which projects above the fuel assembly lower end fitting 91. The fuel assembly lower end fitting 91, in turn, rests on core support plate 80 and is properly positioned by engagement with the fuel assembly alignment pins 106 which are defined by extensions of the tubular support members 88. It is to be noted that support members 88 are threadably engaged in the lower side of support plate 80 and are retained in position by adjustment nuts 108; nuts 108 permitting adjustment of the vertical positioning of plate 80. As may also be seen from FIG. 3, and as noted above, support plate 80 is provided with flow holes 110 for receiving and guiding the tool used to operate the disconnect mechanism 96 (FIG. 2).

FIG. 3 shows the flow path for system fluid with the absorber element in both the raised and inserted positions. Considering first the raised position, lift flow enters at the bottom and flows upwardly through support tube 88, the guide tube retainer nut 104, the annulus between the guide tube 24 and "scram" buffer tube 102 and thereafter upwardly within the tube 24; entry into the annular passage between tubular members 24 and 102 being via transversely extending passages 114. There will be some leakage flow which will pass downwardly between the fuel assembly lower end fitting 90 and the extension 106 of the support tube; this flow passing out into the pressure vessel around the base of the lower end fitting as shown.

With the absorber element inserted, fluid from within the pressure vessel will flow downwardly in tube 24, passing between absorber element 22 and the wall of the guide tube, through the annular passage between tube 24 and buffer 102, through passage 114 and then out of the actuator assembly through tubular support 88. As in the case of the raised absorber, with the absorber element inserted there will be leakage flow between the lower end fitting and support tube extension as shown.

Attention is particularly directed to the cooperating relationship between the blind hole in "scram" buffer tube 102 and extension 100 of the absorber element 22; this cooperation resulting, in the manner well known in the art, in fluid within the blind hole acting as a cushion to assist in slowing down the absorber element as it reaches its lower limit of travel. Under either "gravity" or "power" insertion conditions flow displaced from the blind hole in "scram" buffer tube 102 by the piston extension 100 can not escape from the actuator assembly at a rate which will be sufficiently great to prevent a high momentum impact of the piston 100 against the bottom of the blind hole in buffer 102.

Figure 4:
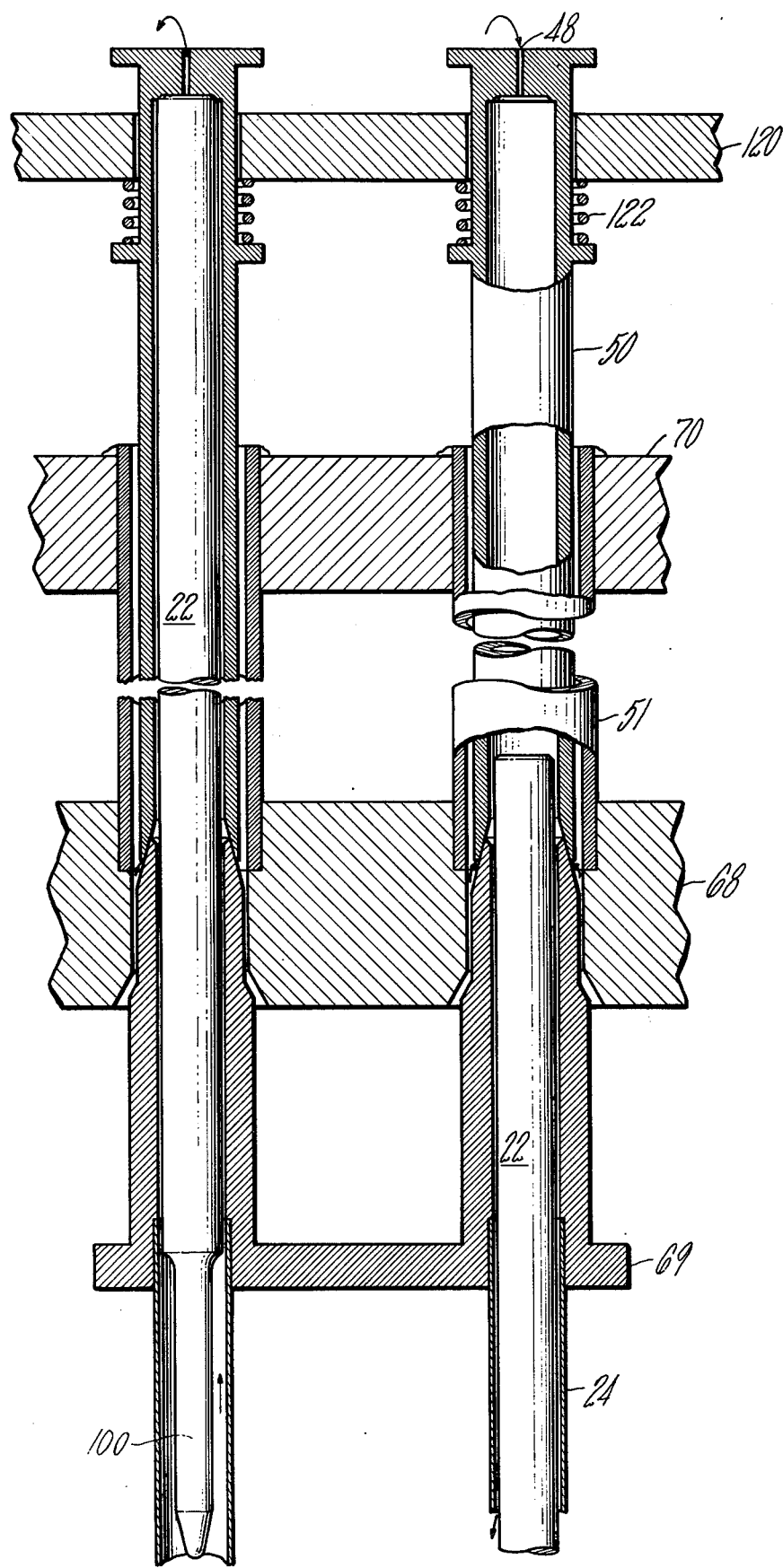
FIG. 4 is an enlarged side elevation view, partially in section, depicting the upper end of the control rod assembly of FIG. 3.

FIG. 4 is a showing of the upper end of the control rod actuators of FIG. 3. FIG. 4 is also a further showing of the blow-out protection scheme discussed above in connection with the description of FIG. 1. By joint reference to FIGS. 2 and 4 it may be seen that the guide tubes terminate in, and typically are welded to, fuel assembly upper end fittings 69. The fuel assembly upper alignment plate 68 loosely engages the upper end fittings, as shown in FIG. 4, and insures proper orientation of the fuel bundles and the actuator cylinders for the absorber elements. For the purposes to be described below, the upper ends of the extensions of the fuel assembly upper end fittings 69 are provided with an outer taper. The upper guide structure support tubes 51 extend upwardly from and are welded to alignment plate 68. Tubes 50 pass through and are welded at their upper ends to the upper guide structure support plate 70. A cylinder support plate 120 is positioned above upper support plate 70 and provides floating support for the upper guide cylinders 50 in which the absorber elements 22 move. The lower end of the cylinders 50 are provided with an internal taper which cooperates with the aforementioned outer taper on the upper ends of the fuel assembly upper end fitting extensions. Springs 122, positioned between the bottom of the cylinder support plate 120 and outwardly extending flanges on the guide cylinders 50, urge the guide cylinders downwardly whereby a partial seal is achieved between tubes 50 and fittings 69. A leakage flow path is nevertheless presented between the abutting ends of guide tubes 50 and end fittings 69; the flow paths for the raised and inserted absorber elements being indicated on FIG. 4. With the absorber elements raised lift flow will pass between the absorber element 22 and the adjacent walls of the tubular members and will pass out through the aforementioned leakage path and also through the blow-down orifice 48 at the top of cylinder 50. With the rod inserted pressure vessel coolant will pass into tube 50 through the blow-down orifice 48 and also through the leakage path between fitting 69 and tube 50; both flows passing downwardly into guide tube 24 and providing the required cooling flow for the absorber element.

With reference now to FIG. 5, a second embodiment of a bottom actuated hydraulic actuator assembly in accordance with the present invention is shown. The principal distinction between the embodiment of FIG. 5 and that of FIGS. 1–4 resides in the elimination of the blow-out protection orifice 48 from the FIG. 5 embodiment. Restated, in the FIG. 5 embodiment the guide cylinder 50 is closed at its upper end. In addition, the FIG. 5 embodiment includes, at the top of the actuator-absorber element 22, a multi-lobed piston indicated generally at 130. The lower lobe of piston 130 is defined by a hemispherically edged disc 132 which, with the absorber element 22 in the fully inserted position, cooperates with a conical inwardly tapering seat defining surface provided at the top of the fuel assembly upper end fitting 69 as shown. The upper end fittings 69 of the FIG. 5 embodiment are also provided with discharge ports 134 which function in the manner to be described below.

In the operation of the FIG. 5 embodiment, when it is desired to raise an absorber element from the inserted position shown, the control system will operate in the manner described with respect to the embodiment of FIGS. 1–4 during the lift mode. As the absorber element 22 is lifted fluid entrapped in upper guide cylinder 50 will be displaced and will flow downwardly in the space between the inner wall of tubular member 50 and the discs or enlargements of piston 130 and thereafter through the annular passage between the walls of member 50 and then fitting 60 and the exterior of absorber element 22; the displaced fluid being discharged into the pressure vessel via ports 134 in fitting 69.

Should a condition requiring blow-out protection arise while the absorber element is in the inserted position, for example should there be a pressure vessel rupture, forces attempting to raise the absorber element will result from the flashing of fluid in control line 26 and/or by the increased upward flow through the actuator assembly resulting from the sudden increase in the pressure differential between the interior of the control line and the interior of the vessel. Proper sizing of the various areas and volumes of the flow paths between the disc portions of piston 130 and the wall of cylinder 50 will insure that the absorber element remains in the inserted position under emergency conditions. This desirable result is obtained by designing piston 130 to provide, with the absorber element in the inserted position, high resistance to flow so that coolant in cylinder 50 above the absorber element can not exit at a rapid rate. Accordingly, should a short duration high pressure differential occur, characteristic of the imposition of atmospheric pressure to the exterior of the actuator assembly, the resultant high lift pressure will decay before coolant entrapped above the actuator assembly in cylinder 50 can leak out of the cylinder. It is to be noted that the coolant within closed cylinder 50 may also flash thereby developing additional hold down pressure which acts on the top of the absorber element and counteracts the pressures resulting from the flashing of fluid in control line 26.

FIG. 6 is a modification of the closed upper guide cylinder embodiment of FIG. 5. In the FIG. 6 embodiment the relatively high resistance of the piston 130 of the FIG. 5 embodiment during normal lift and "scram" cycles is avoided through the expedient of tapering cylinder 50 to thereby gradually reduce the clearance at the bottom section of the upper guide cylinder. FIG. 6 has been shown with the absorber element 22 in the raised position and it is to be noted that the upper end piston 130' is of somewhat different design then piston 130 of the FIG. 5 embodiment. Piston 130' is only effective to restrict flow out of the closed cylinder 50 over a short stroke or section adjacent the lower and narrow end of cylinder 50; i.e. when the absorber element is inserted. In order to facilitate raising of the absorber element the cylinder 50 of the FIG. 6 embodiment is provided with pressure relief ports 136 which serve the same function as ports 134 in fitting 69 of the FIG. 5 embodiment.

The FIG. 6 embodiment may be further distinguished from that of FIG. 5 by the provision of a further piston, indicated generally at 138, at the lower end of the absorber element 22. The lower piston 138 is provided with a conical upper valve defining portion 140 which cooperates with a complimentary seat defining conical taper on the inside of the bore in fuel assembly alignment plate 68. The purpose of piston 138 is to reduce the holding flow necessary to maintain the absorber element in the raised position shown in FIG. 6. Piston 138 may function as a lift piston; i.e., the lift piston function can be separated from the absorber function thereby permitting use of different clearances, materials and shapes for the absorber element in the interest of design flexibility. It is also to be noted that a seal 142, shown schematically in FIG. 6, is provided between alignment plate 68 and fitting 69 to minimize leakage and assist in reducing the requisite holding flow.

Figure 7:
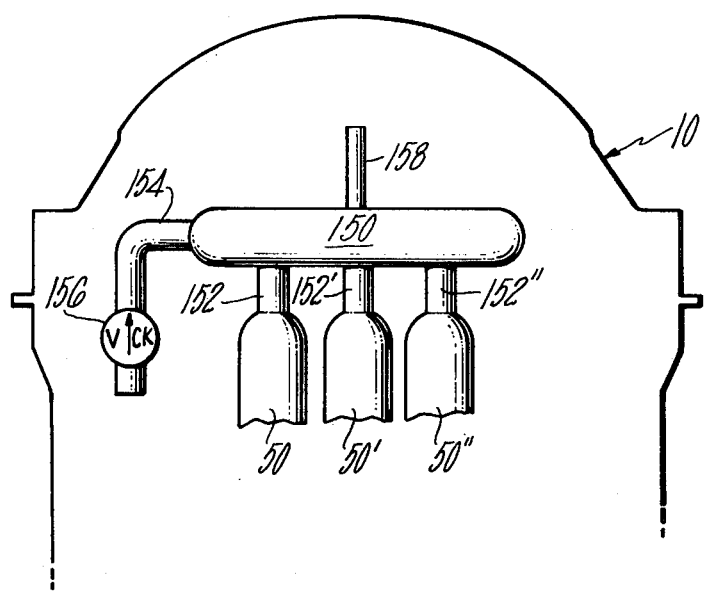
FIG. 7 is a partial schematic illustration of a variation of the control system of FIG. 1.

With reference now to FIG. 7, a modification in the blow-out prevention technique of the embodiment of FIGS. 1–4 is depicted schematically. The use of a single blow-out orifice with each absorber element, such as orifice 48 of FIG. 4, requires that each orifice must permit normal lift flow at a pressure drop that can be economically maintained. However, the individual orifices 48 should be as small as possible to perform the intended safety function with the maximum degree of efficiency. Thus, in the embodiment of FIGS. 1–4, the sizing of the individual orifices 48 must of necessity be a compromise between the small size dictated by safety requirements and a larger size as dictated by lift flow capabilities. In the interest of avoiding this compromise in design the FIG. 7 embodiment contemplates the connection of groups of upper guide cylinders 50 to plenum chambers, such as manifold 150, via flow paths defined by conduits 152. Communication between the interior of the pressure vessel and manifold 150 is accomplished via conduit 154. A check valve 156 may be installed in conduit 154 for the purpose of permitting sufficient coolant flow into the manifold to achieve desired gravity and/or power scram flow rates. A restricted flow path, represented by conduit 158, provides constant communication between the interior of manifold 150 and the interior of pressure vessel 10. Flow path 158 is of sufficient size to permit the absorber elements to be raised individually by achieving normal lift flow at a pressure drop that can be economically maintained. However, should a plurality of absorber elements in the guide cylinders associated with plenum chamber 150 try to move upwardly simultaneously, as would occur during a vessel rupture, the restricted size of conduit 158 will limit the flow to a level insufficient to permit individual control rod movement.

While preferred embodiments have been shown and described various modifications and substitutions may be made thereto without departing from the spirit and scope of the present invention. Accordingly, it is to be understood that the present invention has been described by way of illustration and not limitation.

What is claimed is:

1. In a nuclear reactor, the reactor including a vessel for containing a circulating coolant under pressure and having a fuel assembly disposed therein, the fuel assembly comprising a plurality of fuel elements containing fissionable material and a plurality of guide tubes for movable neutron absorber elements, an improved control system comprising:

first tubular extension means for each of the guide tubes, said first guide tube extension means extending upwardly from the fuel assembly and having open upper ends terminating within the reactor vessel;

first conduit means coupling the lower ends of said first extension means to the upper ends of associated guide tubes, said first conduit means and extension means cooperating with the guide tubes to define hydraulic cylinders which extend above the fuel assembly;

neutron absorber element means disposed for movement in said hydraulic cylinders, each of said absorber element means in part defining a lift piston which cooperates with its associated hydraulic cylinder;

a source of coolant at a lift pressure exceeding the coolant pressure normally maintained within the reactor vessel, said lift pressure source being located exteriorly of the reactor vessel;

second conduit means for selectively and individually coupling the lower ends of the guide tubes to said lift pressure source whereby selected of said absorber element means may be raised by application of lift pressure to the lower ends of said hydraulic cylinders, said second conduit means penetrating the reactor vessel; and passive means connected to the upper ends of said first tubular extension means, said first tubular extension means being associated together in groups comprising less than the total number of guide tubes, each of said groups being associated with a respective of said passive means, said passive means establishing fluid communication between all of the guide tube extension means of each group and the interior of the reactor vessel, said passive means limiting coolant flow through said hydraulic cylinders to a rate commensurate with raising individual of the absorber element means of each group of guide tubes, said passive means thereby preventing simultaneous raising of a plurality of absorber element means upon establishment of a pressure less than normal coolant pressure within the reactor vessel.

2. The apparatus of claim 1 wherein said passive means each comprise:

plenum chamber means;

means providing fluid communication between a plurality of said guide tube extension means and the interior of said plenum chamber means; and means defining a restricted flow path between the interior of said plenum chamber means and the interior of said reactor vessel.

3. The apparatus of claim 2 wherein said passive means each further comprises:

second means providing communication between the interior of said reactor vessel and the interior of said plenum chamber means, said second means permitting coolant flow only into said plenum chamber means whereby sufficient coolant is available to assist in removal of absorber element means from said guide tube extension means upon the termination of application of lift pressure.

4. The apparatus of claim 3 wherein said second communication providing means includes:

conduit means extending from said plenum chamber means into said vessel; and a check valve in said conduit means.

* * * * *